C. F. McCLURE.
NECK YOKE.
APPLICATION FILED JUNE 7, 1915.
1,207,059.
Patented Dec. 5, 1916.
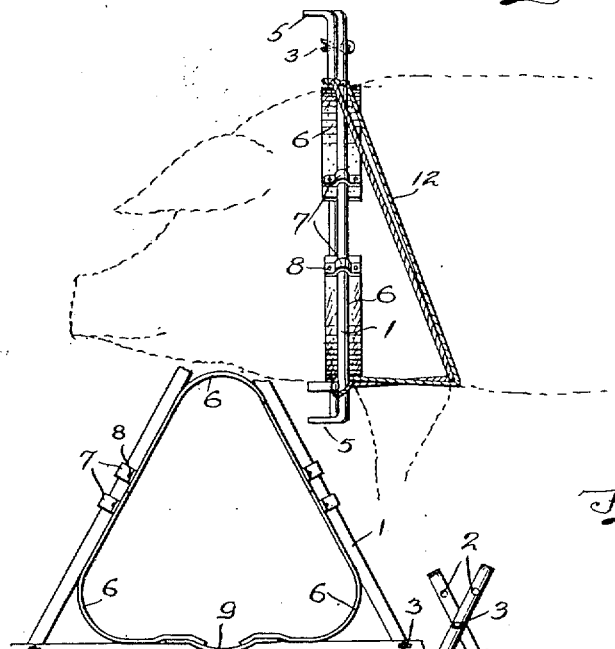
Fig. 1.
Fig. 2.
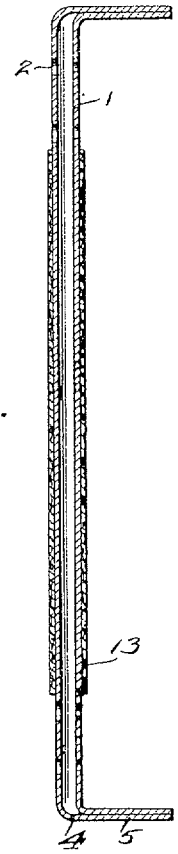
Fig. 5.
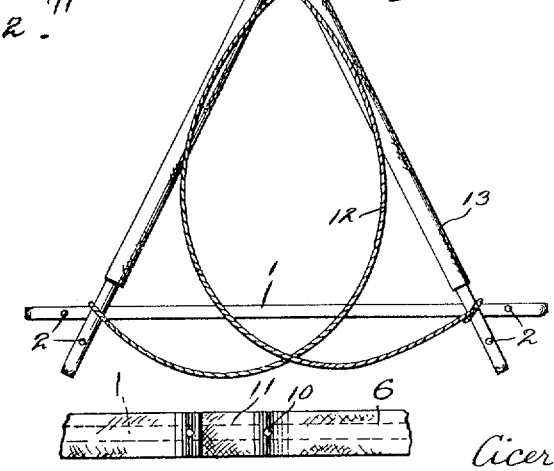
Fig. 4.
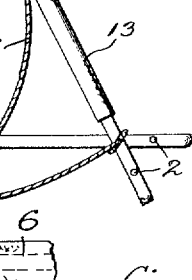
Fig. 3.
Witnesses
Edw. S. Hall.
Wm. Webster Downing
Inventor
Cicero F. McClure.
By Richard B. Owen.
Attorney

UNITED STATES PATENT OFFICE.

CICERO F. McCLURE, OF ANGLETON, TEXAS.

NECK-YOKE.

1,207,059.     Specification of Letters Patent.     Patented Dec. 5, 1916.

Application filed June 7, 1915. Serial No. 32,673.

*To all whom it may concern:*

Be it known that I, CICERO F. MCCLURE, a citizen of the United States, residing at Angleton, in the county of Brazoria and State of Texas, have invented certain new and useful Improvements in Neck-Yokes, of which the following is a specification.

My invention relates to animal neck yokes of the type particularly, though not necessarily, applicable to hogs.

The primary object of my invention resides in the provision of a neck yoke having an improved fastening means associated with the members comprising the frame of the device whereby the members may be adjusted on the necks of the animals to which they are to be applied.

Another object of my invention resides in the provision of an improved protecting means for the animal adjustably associated with the sections for preventing contact of the members, which are preferably formed of iron, with the neck, thus rendering the device comfortable and reducing possibility of sores on an animal to a minimum.

A still further object of my invention resides in the provision of an improved auxiliary fastening means associated with the members, said auxiliary fastening means being particularly desirable when it is necessary to attach the device to a bad or unruly hog.

A still further object of my invention resides in the construction of the members which are preferably tubular, the outer ends of certain of said members having their terminals flattened and bent to provide guarding hooks for preventing the animal from passing through wire fences, the hooks being positioned so that they will engage the wire to prevent passage of the hog through the fence and will become easily disengaged upon movement of the animal from the fence.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings: Figure 1 is a side elevational view of my invention shown in position on a hog in dotted lines; Fig. 2 is a fragmentary elevational view of my invention; Fig. 3 is an enlarged fragmentary top plan view of the bottom member or bar showing to advantage the manner of connecting the ends of certain of the projecting strips; Fig. 4 is a front elevational view of a modified form illustrating to advantage the arrangement of the auxiliary fastening means; and Fig. 5 is an enlarged longitudinal sectional view of one of the members having the modified form of protecting means thereon.

Referring more particularly to the drawings in which similar reference numerals designate like or corresponding parts throughout the different views, I provide a plurality, preferably three, tubular members 1 with a plurality of uniformly spaced and oppositely disposed openings 2 adjacent the respective terminals thereof. It is to be noted that one of the openings of each pair is larger than the opposite opening, this being for a purpose to be hereinafter described. In order to adjustably secure these members together in a triangular formation so that they will be readily attachable to hogs of various sizes, I have provided preferably a plurality of cotter pins 3, the heads of which are receivable partially within the larger of the oppositely disposed openings in the members 1.

In order to prevent a hog, or other animal to which the device is attached, from passing through a wire fence or from permitting other somewhat similar acts, I have found it expedient to flatten the respective terminals of certain of the members, namely those which form the sides of the triangle when the device is in position, as at 4, the flattened portions being bent at substantially right angles to the main portions thereof and provide guarding hooks 5. It is necessary that when these members are applied in position that the hooks be extended in a direction toward the head of the animal so that when the animal approaches the fence, the guarding hooks will engage the wire and prevent the animal from passing through the fence. The hooks are easily disengaged upon movement of the animal away from the fence.

For the purpose of protecting the neck of the animal as much as possible and thus reduce the occurrence of sores on the neck of the animal, I have provided my improved protecting means, which in the preferred form consists of a plurality of strips 6 formed of a rather thick tape-like material. In the present instance three of these strips are employed. Each strip is arranged in a substantially V-shaped configuration and has the respective sides thereof arranged in intimate contact with two of the adjacent members 1 as illustrated to advantage in Fig. 2 of the drawings. In order that these strips may be adjusted during the adjustment of the members 1, I have provided a plurality of metallic straps 7, the latter being rigidly connected through the medium of suitable fastening devices 8 to a point adjacent the ends of the strips and are adapted for sliding movement on the members 1. In order to prevent the accidental displacement of the lower strips from the lower of the members, and also to provide an efficient means for receiving the throat of the animal to which the yoke is attached, I have found it expedient to flatten the lower bar at a point intermediate the ends thereof and bend said flattened portion into an arcuate formation to provide a throat receiving recess 9. This flattened portion of the lower bar permits of the securement of the lower terminals of the lower strips 6 thereto through the medium of suitable fastening devices 10. Since this recess is adapted to be arranged about the throat of the animal and since the strips are of rather thick material, I have secured the terminals of the lower strips to points adjacent the ends of the recess 9. Another strip 11 of relatively thin material is disposed on the bottom of the recess, the terminals of this strip 11 being interposed between the lower terminals of the lower strips 6 and secured at the time the terminals are secured by the fastening devices 10. It will thus be seen by this arrangement of the strips, I have provided an efficient means for minimizing injury to the animal to which the yoke is applied. In instances where one is possessed of a bad or unruly hog, I have found it expedient to employ auxiliary fastening means in the present instance comprising pieces of rope 12, the respective terminals of which are connected to the members 1 adjacent the respective ends thereof. It is to be noted that the lower ends of the ropes are arranged at the inner section of the lower member with the side members, whereas the opposite ends are arranged adjacent the fastening strips 6. It is desirable that the ropes extend in a semi-circular formation so that they may be arranged beneath the forward legs of the animal as illustrated to advantage in Fig. 1 of the drawings.

In Figs. 4 and 5, I have shown a modified form of my protecting means which consists essentially of cloth sleeves 13 formed preferably of thick canvas, said sleeves being slidably arranged on the side members 1.

The operation of my invention is as follows: Assuming that it is desired to apply my improved neck yoke to a hog, the cotter pin 3 which connects the upper ends of the said members or bars is removed and the strip 6 is slid outwardly through the medium of the straps 7, during which movement the bars will move away from each other, thus creating an enlarged area between the bars. The device is now placed about the neck of an animal and the said bars moved toward each other. These bars are now clamped into substantially close engagement with the neck of the animal, the position being maintained through the medium of the cotter pin 3 which passes through the registered adjusting openings in the respective bars. While the adjustment is being obtained, the strips 6 will be forced downwardly on the bars. Should it be desired to employ the auxiliary fastening means, assuming that the lower ends of the rope are fastened at the inner section of the lower bar with the side bars, the free portions are extended about the legs of the animal and have the terminals thereof removably connected to the side bars above the upper of the fastening strips 6. It will be readily apparent that the device being now secured in position, if a hog attempts to go through a wire fence, it will be prevented from so doing when the hooks 5 engage the wire. When the hog moves away from the fence, because of the arrangement of the hooks, they will be easily disengaged.

Although I have shown and described the preferred embodiment of my invention, I desire to be understood that I am not to be limited to the exact details shown, however, I desire that great stress be laid upon the arrangement of the three bars that are adapted to be adjustably clamped in a triangular formation about the neck of an animal for restraining the animal from passing through the fences. Attention is also directed to the provision of a protecting means which minimizes injury to the animal to a considerable extent.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent, is:—

1. A neck yoke including a plurality of tubular members of uniformly spaced openings adjacent the ends thereof, fastening means engaging the openings for adjustably clamping the members in a triangular formation about the neck of an animal, guarding hooks formed by flattening and bending the terminals of said members, and protecting means removably and adjustably mounted on the members.

2. A neck yoke including a plurality of tubular members adjustably clamped in a triangular formation about the neck of an animal, guarding means formed on the ends of the members, and the lower of said members being flattened and bent into a curved formation intermediate its ends to provide a throat receiving recess.

3. A neck yoke including a plurality of members having a plurality of openings adjacent the respective terminals thereof, fastening means passing through the openings for adjustably maintaining the sections in a triangular formation, guarding hooks formed on the terminals of the side members, the lower of said members being flattened and bent intermediate its ends to provide a throat receiving recess, protecting strips adjustably associated with said members, and means for fastening the lower of the fastening strips in the recess to prevent accidental displacement of the strips.

In testimony whereof I affix my signature in presence of two witnesses.

CICERO F. McCLURE.

Witnesses:
ARTHUR O. BRUBAKER,
ELMER P. STOCKWELL.

Copies of this patent may be obtained for five cents each, by addressing the "Commissioner of Patents, Washington, D. C."